(12) United States Patent
Oogose et al.

(10) Patent No.: US 10,966,418 B2
(45) Date of Patent: Apr. 6, 2021

(54) FISHING REEL

(71) Applicant: Shimano Inc., Osaka (JP)

(72) Inventors: Hiroki Oogose, Osaka (JP); Akira Niitsuma, Osaka (JP); Motohiro Niitsuma, Osaka (JP)

(73) Assignee: Shimano Inc., Osaka (JP)

( * ) Notice: Subject to any disclaimer, the term of this patent is extended or adjusted under 35 U.S.C. 154(b) by 39 days.

(21) Appl. No.: 16/448,637

(22) Filed: Jun. 21, 2019

(65) Prior Publication Data

US 2020/0022350 A1 Jan. 23, 2020

(30) Foreign Application Priority Data

Jul. 19, 2018 (JP) .............................. JP2018-135765

(51) Int. Cl.
*A01K 89/01* (2006.01)
*A01K 89/033* (2006.01)

(52) U.S. Cl.
CPC .................................. *A01K 89/051* (2015.05)

(58) Field of Classification Search
CPC ............................. A01K 89/057; A01K 89/058
See application file for complete search history.

(56) References Cited

U.S. PATENT DOCUMENTS

| 4,813,629 | A | * | 3/1989 | Hashimoto | A01K 89/02 242/271 |
| 5,219,131 | A | * | 6/1993 | Furomoto | A01K 89/02 242/223 |
| 5,615,842 | A | * | 4/1997 | Furubayashi | A01K 89/057 242/268 |
| 6,045,073 | A | * | 4/2000 | Ikuta | A01K 89/059 242/260 |
| 8,517,299 | B2 | * | 8/2013 | Nakagawa | A01K 89/0155 242/319 |
| 10,426,151 | B2 | * | 10/2019 | Svensson | A01K 89/046 |
| 2016/0100563 | A1 | * | 4/2016 | Maruoka | A01K 89/058 242/295 |

FOREIGN PATENT DOCUMENTS

JP 11-46641 A 2/1999

\* cited by examiner

*Primary Examiner* — Emmanuel M Marcelo
(74) *Attorney, Agent, or Firm* — Global IP Counselors, LLP

(57) ABSTRACT

A fishing reel includes a reel body that supports a spool so as to be rotatable, and a spool brake. The spool brake includes an operator and a braking force adjuster. The operator is configured to be rotatable and axially immovable with respect to the reel body, and has an internal space extending in an axial direction and opening axially outwardly. The braking force adjuster is disposed in the internal space and is configured to be axially movable with respect to the reel body in conjunction with rotation of the operator to adjust a braking force of the spool.

7 Claims, 6 Drawing Sheets

FISHING REEL

CROSS-REFERENCE TO RELATED APPLICATIONS

This application claims priority to Japanese Patent Application No. 2018-135765, filed on Jul. 19, 2018. The entire disclosure of Japanese Patent Application No. 2018-135765 is hereby incorporated herein by reference.

FIELD OF THE INVENTION

The present invention relates to a fishing reel.

BACKGROUND ART

Conventional fishing reels such as dual-bearing reels include a spool braking mechanism (refer to Japanese Laid-Open Patent Publication No. Hei 11(1999)-46641). These spool braking mechanisms have a bottomed cylindrical operating member and a braking force adjustment member.

For example, in the second embodiment (FIG. 5) disclosed in Japanese Laid-Open Patent Publication No. Hei 11(1999)-46641), the operating member is rotatably mounted and axially immovable with respect to the reel body. The braking force adjustment member is screwed into the inner circumferential surface of the operating member in a state of abutment with an end portion of the spool shaft via a friction member.

In this state, when the operating member is rotated, the braking force adjustment member moves in the axial direction in the inner peripheral portion of the operating member, adjusting the pressing force of the spool shaft, so that the rotation of the spool is braked.

In the above-described spool braking mechanism, when the operating member (e.g., a first operating member) is operated to brake the rotation of the spool, the axial position of the operating member does not change, and the braking force adjustment member moves axially in the inner peripheral portion of the bottomed cylindrical operating member. As a result, the axial position of the first operating member relative to a second operating member, for example, the axial position of the first operating member relative to the handle, does not change, which improves operability. However, it is necessary to secure a space between the bottom portion of the interior of the first operating member and the braking force adjustment member, which corresponds to the amount of movement (stroke amount) of the braking force adjustment member, which requires an operating member with a long axial length.

In addition, since the braking force adjustment member is disposed on the inner peripheral portion of the bottomed cylindrical operating member, it is difficult for the angler to ascertain the amount of movement (stroke amount) of the braking force adjustment member, that is, the degree of the braking force of the spool.

SUMMARY

The present invention was made in light of the above-described problems, and an object thereof is to provide a fishing reel that has a spool braking mechanism with which the axial length of the operating member can be reduced and with which the degree of the braking force of the spool can be easily ascertained.

A fishing reel according to one aspect of the present invention comprises a reel body and a spool braking mechanism. The reel body rotatably supports a spool. The spool braking mechanism comprises an operating member and a braking force adjustment member. The operating member is configured to be rotatable and axially immovable with respect to the reel body. The operating member has an internal space extending in the axial direction and opening axially outward. The braking force adjustment member is disposed in the internal space of the operating member. In order for the braking force of the spool to be adjustable, the braking force adjustment member is configured to be axially movable with respect to the reel body in conjunction with the rotation of the operating member.

In the spool braking mechanism, the internal space of the operating member extends in the axial direction and opens axially outwardly. In this manner, in the spool braking mechanism of the present invention, because the internal space of the operating member includes an opening, it is not necessary to secure, between the operating member and the braking force adjustment member in the axial direction, a space which corresponds to the amount of movement (stroke amount) of the braking force adjustment member. That is, in the fishing reel of the present invention, the axial length of the operating member in the spool braking mechanism can be reduced.

In addition, in the spool braking mechanism of the present invention, the braking force adjustment member is visible from the opening side of the operating member. As a result, when the braking force adjustment member moves in the axial direction in conjunction with the rotation of the operating member, the amount of movement of the braking force adjustment member can be ascertained from the relative axial positions of the operating member and the braking force adjustment member. That is, with the fishing reel of the present invention, the degree of the braking force of the spool can be ascertained.

In the fishing reel according to another aspect of the present invention, the spool braking mechanism preferably further comprises a holding part that is mounted on the reel body to hold the operating member. Here, the operating member includes a body part and a held part. The body part forms an internal space. The held part is disposed on the body part. The held part is disposed between the holding member and the reel body so as to be rotatable.

In this embodiment, the held part of the operating member is rotatably disposed between the holding member and the reel body. As a result, the operating member can be easily mounted on the reel body, so as to be rotatable and axially immovable with respect to the reel body.

In the fishing reel according to another aspect of the present invention, the braking force adjustment member is preferably screwed onto either the operating member or the reel body.

With this configuration, it is possible to easily move the braking force adjustment member axially with respect to the reel body in conjunction with the rotation of the operating member.

In the fishing reel according to another aspect of the present invention, the braking force adjustment member is preferably formed in an essentially bottomed cylindrical shape. In this embodiment, the cylindrical portion of the braking force adjustment member is disposed in the internal space, and at least a portion of the bottom portion of the braking force adjustment member is disposed outside of the opening of the operating member.

With this configuration, as described above, since it is not necessary to secure a space between the operating member and the braking force adjustment member in the axial direction, which corresponds to the amount of movement (stroke amount) of the braking force adjustment member, the axial length of the operating member can be reduced. In addition, the amount of movement of the braking force adjustment member can be easily ascertained from the relative axial positions of the operating member and the bottom portion of the braking force adjustment member.

In the fishing reel according to another aspect of the present invention, the braking force adjustment member preferably has a flange that is disposed on the opening side of the operating member. With this configuration, it is possible to prevent the intrusion of foreign matter into the interior of the braking force adjustment member.

In the fishing reel according to another aspect of the present invention, the operating member preferably has a stepped portion at the end on the opening side. Here, the flange is disposed opposite the stepped portion. With this configuration, it is possible to prevent the intrusion of foreign matter into the interior of the braking force adjustment member.

The fishing reel according to another aspect of the present invention preferably further comprises a sound-emitting structure that is disposed between the operating member and the reel body. With this configuration, an operation of the spool braking mechanism can be made known and the amount of rotation of the operating member can be ascertained.

By the present invention, with the spool braking mechanism of the fishing reel, the axial length of the operating member can be reduced and the degree of the braking force of the spool can be easily ascertained.

DETAILED DESCRIPTION OF THE EMBODIMENTS

Figure 1:
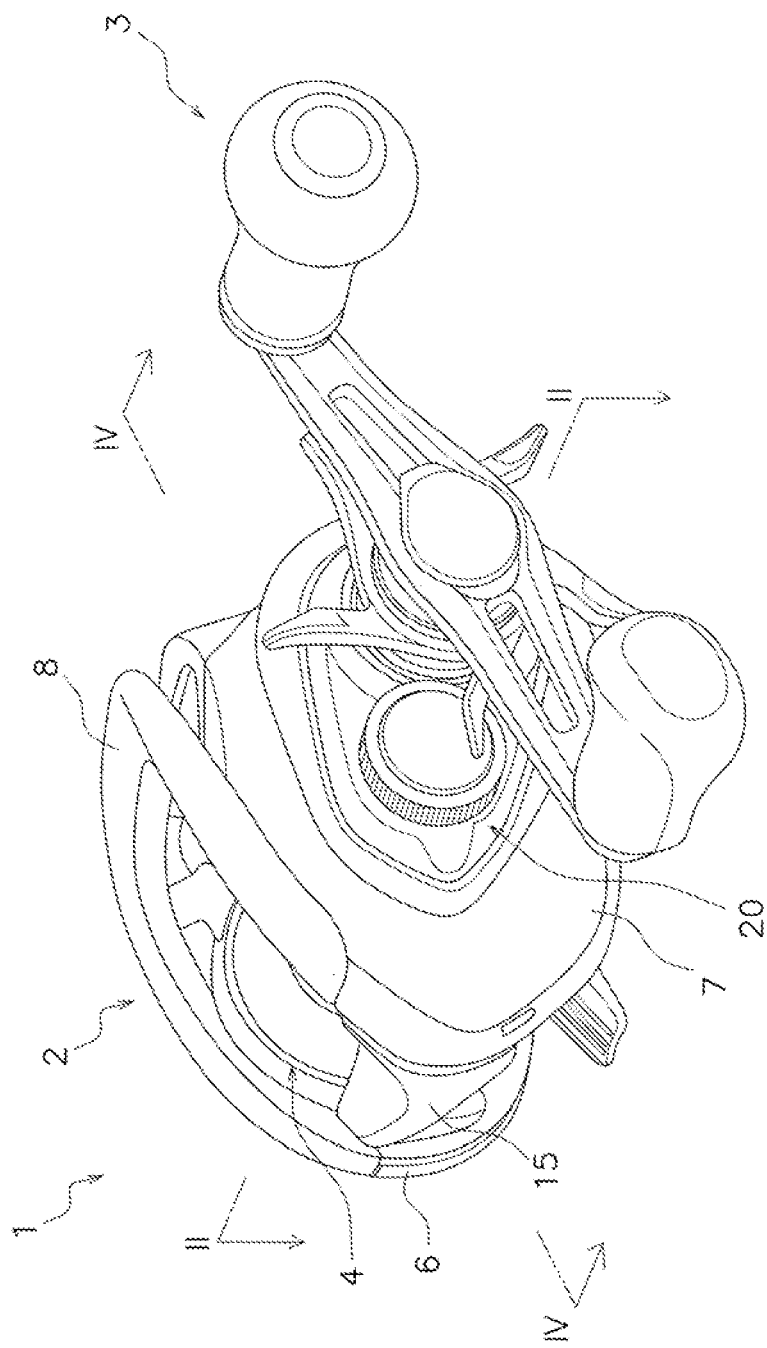
FIG. 1 is a perspective view of a dual-bearing reel employing a first embodiment of the present invention.
Figure 2:
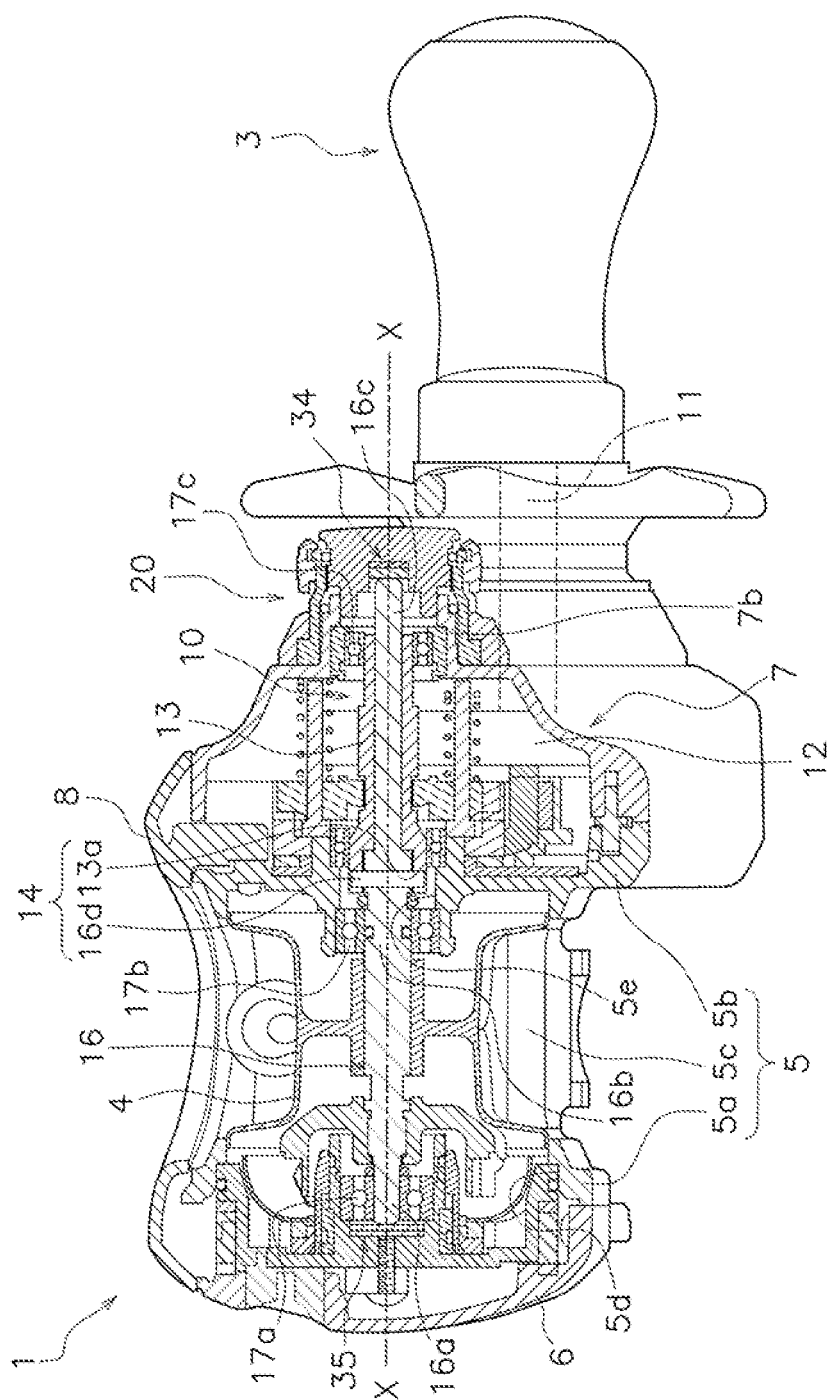
FIG. 2 is a cross-sectional view of the dual-bearing reel taken along section line II-II of FIG. 1.

As shown in FIG. 1, a dual-bearing reel 1 employing a first embodiment of the present invention comprises a reel body 2 and a spool braking mechanism (spool brake) 20 (refer to FIG. 2). More specifically, the dual-bearing reel 1 comprises the reel body 2 that can be mounted on a fishing rod, the handle 3 that is disposed on a side of the reel body 2, the spool 4 that is mounted on the reel body 2 so as to be freely rotatable, and the spool braking mechanism 20.

Hereinbelow, as shown in FIG. 2, the rotational center axis of the spool 4 is referred to as spool axis X. The direction in which the spool axis X extends and the direction along the spool axis X are referred to as the axial direction, and the direction around the spool axis X centered on the spool axis X is referred to as a circumferential direction (rotational direction). Furthermore, the direction away from the spool axis X centered on the spool axis X is referred to as the radial direction.

Reel Body

As shown in FIG. 2, the reel body 2 supports the spool 4 so as to be rotatable. More specifically, the reel body 2 supports the spool 4 so as to be rotatable via a spool shaft 16. The reel body 2 comprises a frame 5, a first side cover 6 and a second side cover 7 that are mounted so as to cover both sides of the frame 5, and a front cover 8 that is mounted in front of the frame 5.

Figure 3:
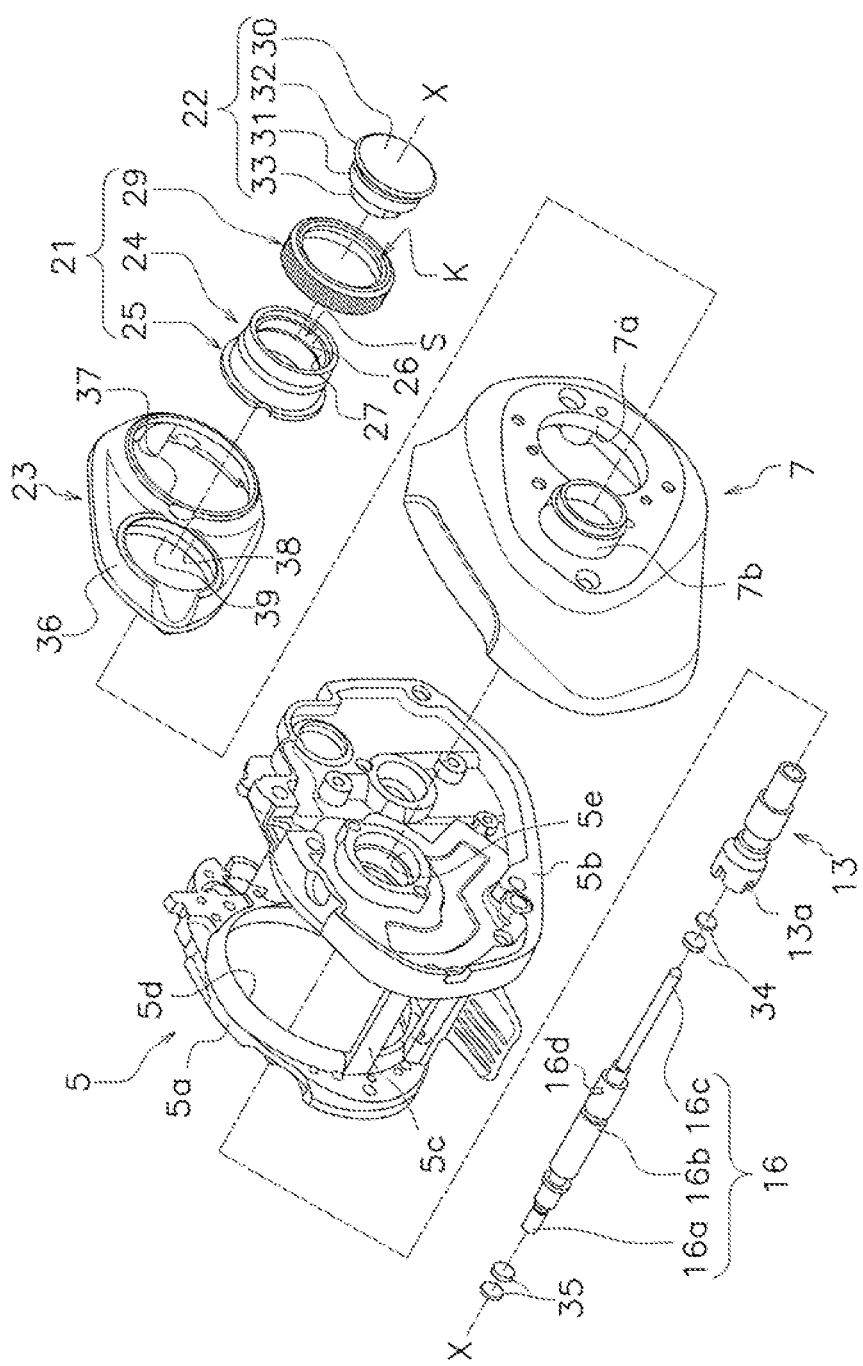
FIG. 3 is an exploded perspective view of a spool braking mechanism.

As shown in FIGS. 2 and 3, the frame 5 has a first side plate 5a and a second side plate 5b, which are disposed spaced apart from and facing each other. The first side plate 5a and the second side plate 5b are connected by a connecting portion 5c. The first side plate 5a has a first opening 5d. As shown in FIG. 2, a shaft bearing housing portion 9 is fixed to the first opening 5d. The first side cover 6 is attached to the first side plate 5a.

As shown in FIGS. 2 and 3, the second side plate 5b has a second opening 5e. As shown in FIG. 2, a spool shaft 16 passes through the second opening 5e. A pinion gear 13 is disposed in the second opening 5e. The second side cover 7 is attached to the second side plate 5b.

As shown in FIG. 3, the second side cover 7 has a third opening 7a for passing a handle shaft 11 (described further below) therethrough and a boss portion 7b. The third opening 7a has an essentially circular shape. The boss portion 7b protrudes axially outward from the outer surface of the second side cover 7. The boss portion 7b has an essentially cylindrical shape. A spool braking mechanism 20 is attached to the boss portion 7b.

Handle

As shown in FIG. 1, the handle 3 is disposed on a side of the reel body 2. More specifically, the handle 3 is disposed on a side of the second side cover 7. As shown in FIG. 2, the rotation of the handle 3 is transmitted to the spool 4 via a rotation transmission mechanism 10. The configuration of the rotation transmission mechanism 10 is essentially the same as the conventional configuration, and thus will be described only briefly here.

The rotation transmission mechanism 10 primarily comprises a handle shaft 11, a drive gear 12, and a pinion gear 13. The handle shaft 11 is attached to the handle 3 so as to be integrally rotatable. The rotation of the handle shaft 11 is transmitted to the drive gear 12 via a drag mechanism (not shown).

The pinion gear 13 meshes with the drive gear 12 and transmits the rotation of the drive gear 12 to the spool shaft 16. The pinion gear 13 has an essentially cylindrical shape and is disposed on the outer peripheral side of the spool shaft 16. The pinion gear 13 has an engagement groove 13a, which can be engaged with and disengaged from an engaging pin 16d disposed on the spool shaft 16. The engaging pin 16d and the engagement groove 13a constitute a clutch mechanism 14.

The engagement or the disengagement of the clutch mechanism 14 is carried out by an on/off operation of a clutch operating member 15 (refer to FIG. 1). When the clutch mechanism 14 is in the ON state, the rotation of the pinion gear 13 is transmitted to the spool shaft 16. When the clutch mechanism 14 is in the OFF state, the rotation of the pinion gear 13 is not transmitted to the spool shaft 16.

Spool

As shown in FIGS. 1 and 2, the spool 4 is disposed between the first side plate 5a and the second side plate 5b so as to be rotatable. The spool 4 is fixed to the spool shaft 16 so as to be integrally rotatable with the spool shaft 16.

As shown in FIG. 2, the spool shaft 16 is configured to be rotatable with respect to the reel body 2. For example, a first end portion 16a of the spool shaft 16 is supported so as to be rotatable with respect to the first side plate 5a via a shaft bearing 17a that is disposed in a shaft bearing housing portion 9.

A central portion 16b of the spool shaft 16 is supported by the second side plate 5b so as to be rotatable via a shaft bearing 17b. The engaging pin 16d, which constitutes the above-described clutch mechanism 14, is disposed in the central portion 16b of the spool shaft 16. A second end portion 16c of the spool shaft 16 is supported by the second side cover 7 so as to be rotatable via the pinion gear 13 and a shaft bearing 17c.

Spool Braking Mechanism

Figure 4:
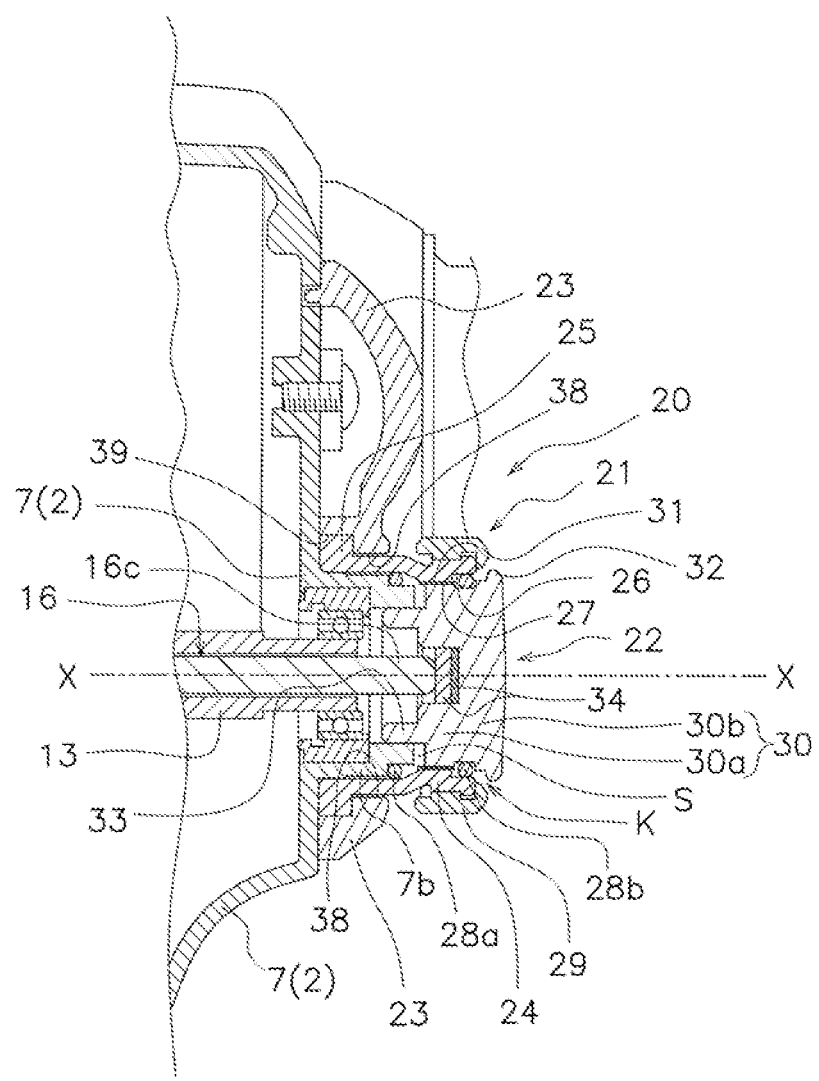
FIG. 4 is a partially enlarged cross-sectional view of the spool braking mechanism taken along section line IV-IV of FIG. 1.

As shown in FIGS. 3 and 4, the spool braking mechanism 20 comprises an operating member (operator) 21 and a braking force adjustment member (braking force adjuster) 22. The spool braking mechanism 20 further comprises a case member 23 (one example of a holding member or holder). The spool braking mechanism 20 further comprises the spool shaft 16 described above.

Operating Member

The operating member 21 is configured to be rotatable and axially immovable with respect to the reel body 2. As shown in FIG. 3, the operating member 21 has an internal space S extending in the axial direction and opening axially outward. The internal space S of the operating member 21 opens axially outwards in a state in which the operating member 21 is disposed in the reel body 2.

As shown in FIG. 3, the operating member 21 has an operated part 24 (one example of the body part) that is operated by a knob part 29 and a held part 25. The operating member 21 further has a first stepped portion 26 (one example of a stepped portion). The operating member 21 further has a female threaded portion 27. More specifically, the operating member has the knob part 29, the operated part 24 (one example of a body part), the held part 25, the first stepped portion 26, and the female threaded portion 27.

The knob part 29 is a part with which angler operates the spool braking mechanism 20. The knob part 29 has an essentially annular shape. The knob part 29 is attached to the outer peripheral portion of the operated part so as to be integrally rotatable with the operated part 24.

The knob part 29 is fixed to the outer peripheral portion of the operated part 24 by a fixing device (or means) such as a press fit, adhesion, or a screw member. The inner circumferential surface of the knob part 29 and the outer circumferential surface of the operated part 24 also may be engaged in a non-circular manner to fix the knob part 29 to the outer peripheral portion of the operated part 24 by the fixing device described above.

The operated part 24 is a part that is operated by the knob part 29. As shown in FIGS. 3 and 4, the operated part 24 forms the internal space S. More specifically, the internal space S is formed by the inner circumferential surface of the operated part 24. The operated part 24 has an essentially cylindrical shape. The operated part 24 is disposed on the inside of a second hole portion 38 (described further below) of the case member 23 in the radial direction.

As shown in FIG. 4, a first seal member 28a is between the operated part 24 and the boss portion 7b of the second side cover 7 in the radial direction is disposed for sealing a gap between the two. The first seal member 28a abuts the inner circumferential surface of the operated part 24 when disposed in a small diameter portion of the boss portion 7b.

As shown in FIG. 3, the held part 25 is disposed on the operated part 24. More specifically, the held part 25 is integrally formed with the operated part 24. The held part 25 protrudes radially outward from the operated part 24. The held part 25 has an essentially annular shape.

As shown in FIG. 4, the held part 25 is disposed between the case member 23 and the reel body 2 so as to be rotatable. Here, the held part 25 is disposed between the case member 23 and the second side cover 7 of the reel body 2 in the axial direction.

As shown in FIGS. 3 and 4, the first stepped portion 26 is formed at the end of the operated part 24. More specifically, the first stepped portion is disposed at the end of the operated part 24 on the side away from the second side cover 7. The first stepped portion 26 has an annular shape on the inner circumferential surface of the operated part 24. A flange 32 (described further below) of the braking force adjustment member 22 is disposed opposite the first stepped portion 26.

The female threaded portion 27 is disposed on the inner circumferential surface of the operated part 24. More specifically, the female threaded portion 27 is formed on the inner circumferential surface of the operated part 24 between the first stepped portion 26 and the second side cover 7 in the axial direction. The braking force adjustment member 22 is screwed into the female threaded portion 27.

Braking Force Adjustment Member

The braking force adjustment member 22 is configured to be movable in the axial direction with respect to the reel body 2 in conjunction with rotation of the operating member 21, to adjust the braking force of the spool 4. As shown in FIGS. 3 and 4, the braking force adjustment member 22 is disposed in the internal space S of the operating member 21. The braking force adjustment member 22 penetrates the internal space S of the operating member 21 toward opening K side.

The braking force adjustment member 22 has an essentially bottomed cylindrical shape. A cylindrical portion 30a (described further below) of the braking force adjustment member 22 is disposed in the internal space S. At least a portion of a bottom portion 30b (described further below) of the braking force adjustment member 22 is disposed outside of the opening K of the operating member 21. Here, the opening K of the operating member 21 is on the outside of the operating member 21 in the axial direction.

The braking force adjustment member 22 is attached to the operating member 21. For example, the braking force adjustment member 22 is screwed into the operating member 21. More specifically, the braking force adjustment member 22 is screwed into the operated part 24. The spool shaft 16 abuts the braking force adjustment member 22.

The braking force adjustment member 22 has the flange 32. More specifically, the braking force adjustment member 22 has a body portion 30, a male threaded portion 31, the flange 32, and a projecting portion (projection) 33. The body portion 30 has an essentially bottomed cylindrical shape. The body portion 30 is disposed in the internal space S of the operating member 21.

More specifically, the cylindrical portion 30a of the body portion 30 is disposed in the internal space S of the operating member 21, for example, in the inner peripheral portion of the operated part 24. The bottom portion 30b of the body portion 30 is disposed on the opening K side of the operating member 21. More specifically, a portion of the bottom portion 30b of the body portion 30 is disposed on the outside of the opening K of the operating member 21. A portion of the bottom portion 30b of the body portion 30 is disposed on the outside of the opening K of the operating member 21 between the operating member 21 and the handle 3 in the axial direction. The male threaded portion 31 is disposed on the outer circumferential surface of the cylindrical portion 30a. The male threaded portion 31 is screwed into the female threaded portion 27 of the operating member 21.

As shown in FIG. 4, a second seal member 28b is disposed between the operated part 24 and the body portion 30 in the radial direction for sealing a gap between the two. The second seal member 28b abuts the inner circumferential surface of the operated part 24 on the distal end side when disposed on the outer circumferential surface of the body portion 30.

As shown in FIGS. 3 and 4, the flange 32 is disposed at one (a first) end portion of the body portion 30. For example, the flange 32 protrudes radially outwardly from the bottom portion 30b of the body portion 30. The flange 32 has an essentially annular shape. The flange 32 is disposed on the opening K side of the operating member 21. At least a portion of the flange 32 is disposed on the outer side of the opening K of the operating member 21. Here, in the axial direction, the flange 32 is disposed between the operating member 21 and the handle 3 in the axial direction, on the outside of the opening K of the operating member 21. In addition, the flange 32 is disposed opposite the first stepped portion 26 of the operating member 21.

The projecting portion 33 is disposed at the other (a second) end portion of the body portion 30. For example, the projecting portion 33 protrudes in the axial direction from the other end portion of the body portion 30. More specifically, the projecting portion 33 protrudes from the other end portion of the body portion 30 toward the second side cover 7.

As shown in FIG. 3, the projecting portion 33 has an essentially annular shape. As shown in FIG. 4, the second end portion 16c of the spool shaft 16 is disposed in the inner peripheral portion of the projecting portion 33. More specifically, the second end portion 16c of the spool shaft 16 abuts the bottom portion 30b of the operating member via a friction member 34 in the inner peripheral portion of the projecting portion 33.

As shown in FIG. 2, the first end portion 16a of the spool shaft 16 is positioned in the axial direction with respect to the reel body 2. More specifically, the first end portion 16a of the spool shaft 16 is positioned by the shaft bearing housing portion 9, which is fixed to the reel body 2, in the axial direction. The first end portion 16a of the spool shaft 16 abuts the shaft bearing housing portion 9 via a friction member 35.

The projecting portion 33 has a smaller diameter than the body portion 30. The projecting portion 33 is disposed in the inner peripheral portion of the boss portion 7b of the second side cover 7. The boss portion 7b is disposed between the projecting portion 33 and the operating member 21 (operated part 24) in the radial direction.

The outer circumferential surface of the projecting portion 33 and the inner circumferential surface of the boss portion 7b have a non-circular shape. As a result, when the projecting portion 33 is disposed in the inner peripheral portion of the boss portion 7b, the projecting portion 33 is non-rotatable and axially movable with respect to the boss portion 7b. As a result, the braking force adjustment member 22 is guided in the axial direction without rotating relative to the boss portion 7b when positioned in the radial direction by the boss portion 7b. The boss portion 7b may be regarded as one configuration of the spool braking mechanism 20.

Case Member

The case member 23 is attached to the reel body 2 to hold the operating member 21. For example, as shown in FIGS. 3 and 4, the case member 23 is attached to the second side cover 7. The case member 23 has a case body 36, a first hole portion 37, the second hole portion 38, and a second stepped portion 39. The case body 36 is fixed to the reel body 2, for example, to the second side cover 7.

As shown in FIG. 3, the first hole portion 37 is disposed in the case body 36. The first hole portion 37 penetrates the case body 36 axially in a state in which the case body 36 is fixed to the second side cover 7. A handle shaft 11 is inserted in the first hole portion 37.

As shown in FIG. 4, the second hole portion 38 is disposed in the case body 36. The second hole portion 38 penetrates the case body 36 in the axial direction, when the case body 36 is fixed to the second side cover 7. The operated part 24 of the operating member 21 and the boss portion 7b of the second side cover 7 are disposed in the second hole portion 38.

The second stepped portion 39 is disposed on the case body 36. More specifically, the second stepped portion 39 is disposed on the case body 36 on the outside of the second hole portion 38 in the radial direction. The second stepped portion 39 is formed in the case body 36 so as to oppose the reel body 2, for example, the second side cover 7, in the axial direction. The second stepped portion 39 has an annular shape along the outer circumferential surface of the held part 25 of the operating member 21.

The held part 25 of the operating member 21 is disposed on the second stepped portion 39. More specifically, the held part 25 of the operating member 21 is disposed between the second stepped portion 39 and the second side cover 7 in the axial direction. As a result, the operating member 21 is retained in the axial direction with respect to the reel body 2 (second side cover 7).

Operation of the Spool Braking Mechanism

When the angler rotates the operating member 21, the held part 25 of the operating member 21 rotates relative to the second side cover 7 of the reel body 2, when held between the second stepped portion 39 of the case member 23 and the second side cover 7 of the reel body 2 in the axial direction. Then, in conjunction with the rotation of the operating member 21, the braking force adjustment member 22 moves in the axial direction with respect to the second side cover 7 of the reel body 2 on the inner side of the operated part 24 of the operating member 21 in the radial direction.

Then, when the first end portion 16a of the spool shaft 16 is supported in the axial direction by the reel body 2, such as the shaft bearing housing portion 9, the second end portion 16c of the spool shaft 16 is pressed in the axial direction, or the pressure thereon in the axial direction is relaxed, by the braking force adjustment member 22.

That is, the pressing force of the spool shaft 16 in the axial direction is adjusted by the rotation of the operating member 21 when the spool shaft 16 is sandwiched by the reel body 2 (shaft bearing housing portion 9) and the braking force adjustment member 22. The rotation of the spool is braked by this adjustment of the pressing force of the spool shaft 16.

In the spool braking mechanism 20 that operates in this manner, the internal space S of the operating member 21, such as the internal space S formed by the inner circumferential surface of the operated part 24, extends in the axial direction and opens axially outwards. In this manner, in the spool braking mechanism 20, since the opening K is provided in the internal space S of the operating member 21, an end portion of the braking force adjustment member 22 (an end portion on the flange 32 side, such as portions of the flange 32 and the bottom portion 30*b*) is exposed from this opening K. As a result, it is not necessary to secure, between the operating member 21 and the braking force adjustment member 22, a space which corresponds to the amount of movement (stroke amount) of the braking force adjustment member 22 in the axial direction. That is, with the dual-bearing reel 1, it is possible to reduce the axial length of the operating member 21 in the spool braking mechanism 20.

In addition, in the spool braking mechanism 20, the end portion of the braking force adjustment member 22 (the end portion on the flange 32 side, such as portions of the flange 32 and the bottom portion 30*b*) is visible from the outside of the opening K of the operating member 21. As a result, when the braking force adjustment member 22 moves in the axial direction in conjunction with the rotation of the operating member 21, the amount of movement of the braking force adjustment member 22, such as the amount of movement of the flange 32 and the bottom portion 30*b*, can be ascertained. That is, with the dual-bearing reel 1, it is possible to ascertain the degree of the braking force of the spool.

MODIFIED EXAMPLE

One embodiment of the present invention is described above, but the present invention is not limited to the above-described embodiment, and various modifications can be made without departing from the scope of the invention.

Modified Example 1

In the above-described embodiment, an example is presented in which the braking force adjustment member 22 is screwed into the operating member 21 in the spool braking mechanism 20, but the braking force adjustment member 22 may be screwed into the reel body 2.

Figure 5:
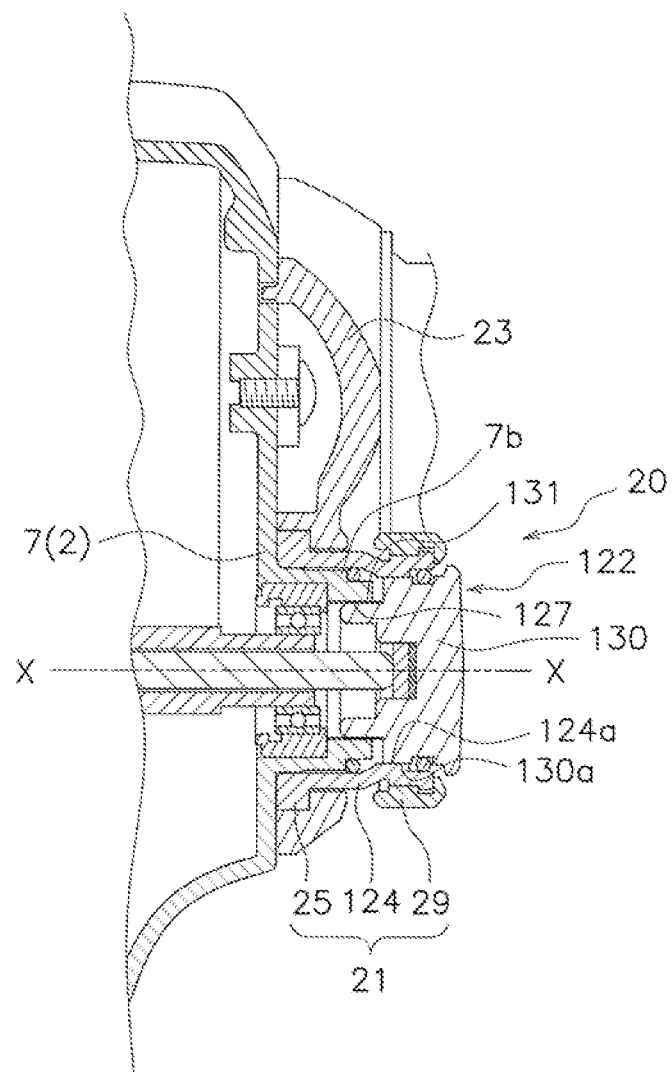
FIG. 5 is a partially enlarged cross-sectional view of Modified Example 1.

For example, as shown in FIG. 5, a braking force adjustment member (braking force adjuster) 122 is screwed into the reel body 2, such as the second side cover 7. More specifically, the braking force adjustment member 122 is screwed into the boss portion 7*b* of the second side cover 7. In this embodiment, a male threaded portion 131 of the braking force adjustment member 122 is screwed into a female threaded portion 127 disposed on the boss portion 7*b*.

An operating member (operator) 121 is attached to the braking force adjustment member 122 so as to be integrally rotatable with the braking force adjustment member 122 and to be movable in the axial direction with respect to the braking force adjustment member 122. For example, an inner circumferential surface 124*a* of the operating member 121 (operated part 124) on the opening side has an essentially non-circular shape. An outer circumferential surface 130*a* of the braking force adjustment member 122 (body portion 130) has a non-circular shape.

By engaging the outer circumferential surface 130*a* of the braking force adjustment member 122 with the inner circumferential surface 124*a* of the operating member 121, the operating member 121 is integrally rotatable with the braking force adjustment member 122 and is movable in the axial direction with respect to the braking force adjustment member 122. That is, if the operating member 121 is in a state in which the braking force adjustment member 122 is screwed into the boss portion 7*b*, the braking force adjustment member 122 moves in the axial direction while rotating together with the operating member 121. The same effects as described above can be achieved even if configured in this manner.

Modified Example 2

Figure 6:
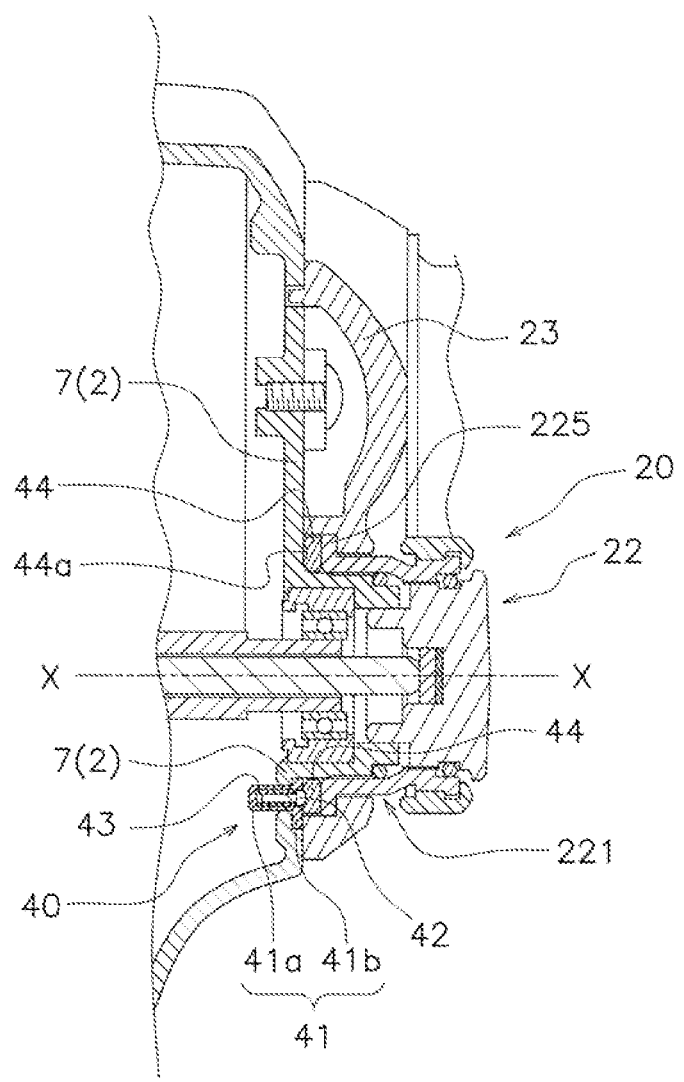
FIG. 6 is a partially enlarged cross-sectional view of Modified Example 2.

A sound-emitting structure 40 discussed below may be applied to the spool braking mechanism 20 of the above-described embodiment. For example, as shown in FIG. 6, the sound-emitting structure 40 is disposed between the reel body 2 and an operating member (operator) 221.

In this embodiment, the sound-emitting structure (sound emitter) 40 comprises a mounting member 41, a sound-emitting pin 42, a coil spring 43, and a sound-emitting member 44. The mounting member 41 has a pin holding portion 41*a* and a mounting portion 41*b*. The pin holding portion 41*a* has an essentially bottomed cylindrical shape. The pin holding portion 41*a* is inserted from the outside of the second side cover 7 into the inside of the second side cover 7 through a mounting hole 7*c* disposed on the second side cover 7. The mounting portion 41*b* protrudes from the outer circumferential surface of the pin holding portion 41*a* and has an annular shape. The mounting portion 41*b* is disposed between the outer surface of the second side cover 7 and the operating member 221.

The sound-emitting pin 42 is disposed on the inner peripheral portion of the pin holding portion 41*a*. The coil spring 43 is disposed between the sound-emitting pin 42 and the pin holding portion 41*a*. The coil spring 43 biases the sound-emitting pin 42 toward the operating member 221 when the sound-emitting pin 42 is biased by the coil spring 43, the head portion of the sound-emitting pin 42 protrudes from the mounting portion 41*b* in the axial direction.

The sound-emitting member 44 has an annular shape. The sound-emitting member 44 is disposed between the mounting member 41 and the operating member 221 in the axial direction. The sound-emitting member 44 is attached to the operating member 221 so as to be integrally rotatable with the operating member 221. More specifically, the sound-emitting member 44 is fixed to a held part 225 by a fixing device, such as adhesion.

The sound-emitting member 44 has a plurality of sound-emitting recesses 44*a*, which are arranged at prescribed intervals in the circumferential direction. Each of the sound-emitting recesses 44*a* is configured such that the head portion of the sound-emitting pin 42 can make contact with the recesses. For example, each of the sound-emitting recesses 44*a* is formed to be a recess in the axial direction so as to oppose the head portion of the sound-emitting pin 42.

If the dual-bearing reel 1 has the sound-emitting structure 40 described above, when the operating member 221 is rotated, the head portion of the sound-emitting pin 42 repeatedly contacts each of the plurality of sound-emitting recesses 44*a*. The sound-emitting structure 40 thereby generates sound, and the operation of the operating member 221, that is, the operation of the spool braking mechanism 20, is known to the angler. The sound-emitting structure 40 can also be operated in a similar manner by being applied to the configuration of Modified Example 1 described above.

OTHER EMBODIMENTS

In the above-described embodiment, an example is presented in which the operated part 24 and the knob part 29 are separate bodies, but the knob part 29 and the operated part 24 may be integrally formed. In this embodiment, the knob part 29 and the operated part 24 can be regarded as one example of the body portion described in the claims.

In the above-described embodiment, an example is presented in which the case member 23 covers the periphery of the handle shaft 11 and the periphery of the operating member 21 by providing the first hole portion 37 and the second hole portion 38 in the case member 23. Alternatively, it is possible to configure the case member 23 to cover only the periphery of the spool braking mechanism 20 by providing only the second hole portion 38 in the case member 23.

In the above-described embodiment, an example is presented in which the flange 32 of the braking force adjustment member 22 is disposed on the outside of the opening K of the operating member 21 (operated part 24 and knob part 29), but a portion of the flange 32 may be disposed outside of the opening K as well. In addition, when at least a portion of the flange 32 of the braking force adjustment member 22 is disposed outside of the opening K of the operating member 21, the flange 32 as a whole may be disposed inside of the opening K (internal space S) of the operating member 21 when the operating member 21 is operated.

In the above-described embodiment, an example is presented in which a portion of the bottom portion 30b of the braking force adjustment member 22 is disposed outside of the opening K of the operating member 21 (operated part 24 and knob part 29), but the bottom portion 30b as a whole may be disposed outside of the opening K. Alternatively, the bottom portion 30b as a whole may be disposed inside of the opening K. Furthermore, in a state in which at least a portion of the bottom portion 30b of the braking force adjustment member 22 is disposed outside of the opening K of the operating member 21, the bottom portion 30b as a whole may be disposed inside of the opening K (internal space S) when the operating member 21 is operated.

In the above-described embodiment, an example is presented in which the flange 32 is disposed on the bottom portion 30b of the braking force adjustment member 22, but the braking force adjustment member 22 may be configured without the flange 32 on the bottom portion 30b of the braking force adjustment member 22.

What is claimed is:

1. A fishing reel, comprising:
   a reel body supporting a spool so as to be rotatable; and
   a spool brake comprising an operator configured to be rotatable and axially immovable with respect to the reel body and having an internal space extending in an axial direction and an opening that opens axially outwardly, and a braking force adjuster disposed in the internal space and configured to be axially movable with respect to the reel body in conjunction with rotation of the operator to adjust a braking force of the spool, a portion of the braking force adjustment member being configured to be visible from outside of the opening of the operator.

2. The fishing reel according to claim 1, wherein
   the spool brake further comprises a holder that is mounted on the reel body to hold the operator, and
   the operator includes a body part forming the internal space and a held part disposed in the body part between the holder and the reel body so as to be rotatable.

3. The fishing reel according to claim 1, wherein
   the braking force adjuster screws into one of the operator or the reel body.

4. A fishing reel, comprising:
   a reel body supporting a spool so as to be rotatable; and
   a spool brake comprising an operator configured to be rotatable and axially immovable with respect to the reel body and having an internal space extending in an axial direction and opening axially outwardly, and a braking force adjuster disposed in the internal space and configured to be axially movable with respect to the reel body in conjunction with rotation of the operator to adjust a braking force of the spool,
   the braking force adjuster having an essentially bottomed cylindrical shape,
   a cylindrical portion of the braking force adjuster being disposed in the internal space, and
   at least a portion of a bottom portion of the braking force adjuster being disposed outside of an opening of the operator.

5. The fishing reel according to claim 1, wherein
   the braking force adjuster has a flange disposed on an opening side of the operator.

6. The fishing reel according to claim 5, wherein
   the operator has a stepped portion disposed at an end on the opening side, and
   the flange is disposed opposite the stepped portion.

7. The fishing reel according to claim 1, further comprising a sound-emitter disposed between the operator and the reel body.

* * * * *